United States Patent [19]

Inui et al.

[11] Patent Number: 4,466,241
[45] Date of Patent: Aug. 21, 1984

[54] WASTE HEAT RECOVERY BOILER

[75] Inventors: Taiji Inui, Hitachi; Makoto Sasaki, Morioka, both of Japan

[73] Assignee: Hitachi, Ltd., Tokyo, Japan

[21] Appl. No.: 4,266

[22] Filed: Jan. 17, 1979

[30] Foreign Application Priority Data

Jan. 18, 1978 [JP] Japan ................................. 53-3381

[51] Int. Cl.³ .............................................. F02C 6/18
[52] U.S. Cl. .................................. 60/39.182; 60/39.5; 122/7 R
[58] Field of Search ......................... 60/39.18 B, 39.5; 122/4 D, 7 R; 423/239

[56] References Cited

U.S. PATENT DOCUMENTS

| 4,106,286 | 8/1978 | Sakai et al. | 60/39.18 B |
| 4,160,805 | 7/1979 | Inaba et al. | 122/4.6 |
| 4,164,546 | 8/1979 | Welty | 423/239 A |

Primary Examiner—Louis J. Casaregola
Attorney, Agent, or Firm—Antonelli, Terry & Wands

[57] ABSTRACT

A waste heat recovery boiler for generating steam by utilizing a flue gas discharged from a gas turbine as a heat source comprises an economizer for preheating feedwater by the flue gas, an evaporator for evaporating the preheated feedwater, and a superheater for generating a steam for driving a steam prime mover by heating the evaporated feedwater. The economizer, the evaporator and the superheater are successively arranged in the direction from a downstream side to an upstream side of flue gas passage. The evaporator itself is divided into two sections and an apparatus for removing $NO_x$ is provided in a space between the divided two sections of the evaporator in the flue gas passage to remove $NO_x$ from the flue gas. An $NO_x$ concentration of a flue gas discharged from a combined cycle power plant including the gas turbine can be stably abated at any of full and partial loads.

11 Claims, 5 Drawing Figures

WASTE HEAT RECOVERY BOILER

BACKGROUND OF THE INVENTION

This invention relates to a waste heat recovery boiler for generating steam for driving a steam prime mover by utilizing a flue gas discharged from a gas turbine, and more particularly to a waste heat recovery boiler for abating an $NO_x$ concentration of the flue gas.

One of main problems encountered in the development of gas turbines is an abatement of $NO_x$ in flue gas. To this end, an apparatus for decreasing the $NO_x$ concentration in a combustion apparatus and removing $NO_x$ from the flue gas has been so far proposed.

One of the apparatuses for removing $NO_x$ from the flue gas is disclosed, for example, in U.S. Pat. No. 4,106,286, and the process for removing $NO_x$ used in the apparatus is called a dry catalytic reduction-decomposition process, where ammonia is injected into a flue gas and then the flue gas is passed through a reactor filled with an iron oxide-based catalyst to decompose $NO_x$ into harmless nitrogen and steam by reduction. It is known in the process for removing $NO_x$ that a percent $NO_x$ removal greatly depends upon a reaction temperature of catalyst bed, that is, a temperature of combustion gas passing through the catalyst bed of the apparatus for removing $NO_x$, as shown in FIG. 1. That is, as is evident from FIG. 1, the percent $NO_x$ removal is rapidly increased, as the reaction temperature increases from 200° C. to 300° C., and approaches almost a maximum above 330° C., and almost the maximum percent $NO_x$ removal can be kept up to about 400° C. The percent $NO_x$ removal is then lowered above 450° C. Thus, it is desirable that the temperature of flue gas passing through the catalyst bed is 300° to 450° C., and the apparatus for removing $NO_x$ is provided between the evaporator and the economizer, where the temperature of flue gas can be obtained, in view of a rated load operation.

At a partial load operation, for example, 30% partial load operation, of the apparatus, the flue gas from the gas turbine has a temperature of about 250° C., when it passes through the apparatus for removing $NO_x$, and as is evident from the temperature characteristics of the apparatus for removing $NO_x$ shown in FIG. 1, the percent $NO_x$ removal is too much lowered to satisfy the desired abatement of $NO_x$ concentration.

SUMMARY OF THE INVENTION

An object of the present invention is to provide a waste heat recovery boiler having an apparatus for removing $NO_x$, capable of maintaining a high percent $NO_x$ removal and abating an $NO_x$ concentration of a combustion gas as a heat source at any of rated load and partial load operations.

Another object of the present invention is to increase the percent $NO_x$ removal of the apparatus for removing $NO_x$ provided in the waste heat recovery boiler.

According to one feature of the present invention to satisfy these objects, the present invention provides a waste heat recovery boiler comprising a gas passage for conducting a flue gas discharged from a gas turbine, an economizer for preheating feedwater by the flue gas, an evaporator for evaporating the preheated feedwater, and a superheating for generating steam for driving a steam prime mover by heating the evaporated feedwater, the economizer, the evaporator and the superheater are successively arranged in a direction of downstream to upstream side of the said gas passage. The evaporator is divided into two sections at a zone in which a flue gas temperature in the gas passage is 300° C. to 450° C. in any state of load operation of the gas turbine, and an apparatus is provided for removing $NO_x$ from the flue gas in a space in the gas passage between the two divided sections of the evaporator.

According to another feature of the present invention, the waste heat recovery boiler is characterized in that the apparatus for removing $NO_x$ is based on simultaneous use of a gas phase reduction of $NO_x$ by injection of ammonia and a catalytic reduction by use of a catalyst bed.

According to another feature of the present invention, the waste heat recovery boiler is characterized in that the catalyst bed is divided into a plurality of compartments by a plurality of ducts, and flow rate control devices for controlling flow rates of flue gas passing through the individual ducts are provided.

BRIEF DESCRIPTION OF THE DRAWINGS

FIG. 4 is a flow diagram of a combined cycle power plant comprising a gas turbine and a steam turbine, provided with the waste heat recovery boiler of the present invention, and FIG. 5 is a partial view of the structure of the waste heat recovery boiler having an apparatus for removing $NO_x$ therein.

DETAILED DESCRIPTION OF THE PREFERRED EMBODIMENTS

One embodiment of a combined cycle power plant provided with the waste heat recovery boiler according to the present invention will be described below.

Figure 4:
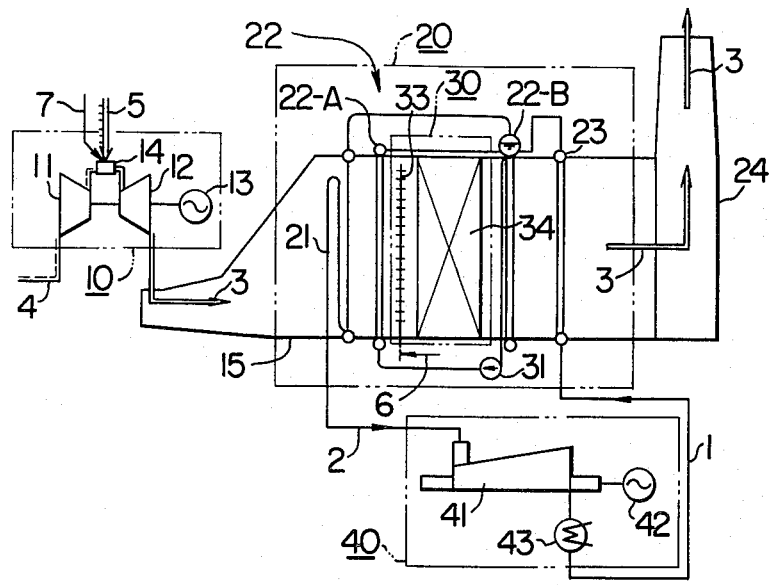
FIGS. 4 and 5 show one embodiment of the waste heat recovery boiler according to the present invention, where

In FIG. 4, a combined cycle power plant comprises a gas turbine 10, a waste heat recovery boiler 20 for generating steam by utilizing a flue gas discharged from the gas turbine as a heat source, a steam turbine 40 utilizing the vapor generated in the waste heat recovery boiler as a driving steam, and an apparatus 30 for removing $NO_x$ from the flue gas discharged from the gas turbine 10. The gas turbine 10 further comprises an air compressor 11 for compressing an introduced air 4, a combustor 14 of combusting a fuel fed through a fuel system 5 with the compressed air, a turbine 12 driven by the flue gas produced by the combustion, and an electric generator 13 for taking up a load. The waste heat recovery boiler 20 further comprises a superheater 21, an evaporator generally designated by the reference numeral 22, an economizer 23, and a stack 24, arranged successively in a direction from upstream side to downstream side of the flue gas stream from the gas turbine 10. The steam generated in the superheater 21 is led to the steam turbine 40 through a steam piping 2, and the load is taken up by an electric generator 41. Feedwater is fed to the economizer 23 through a feedwater piping 1 from the steam turbine 40.

Figure 1:
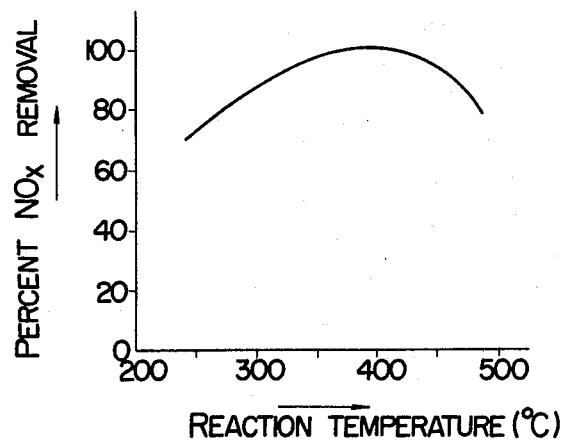
FIG. 1 is a temperature characteristic diagram showing a percent $NO_x$ removal in an apparatus for removing $NO_x$ by dry catalytic reduction-decomposition process.
Figure 2:
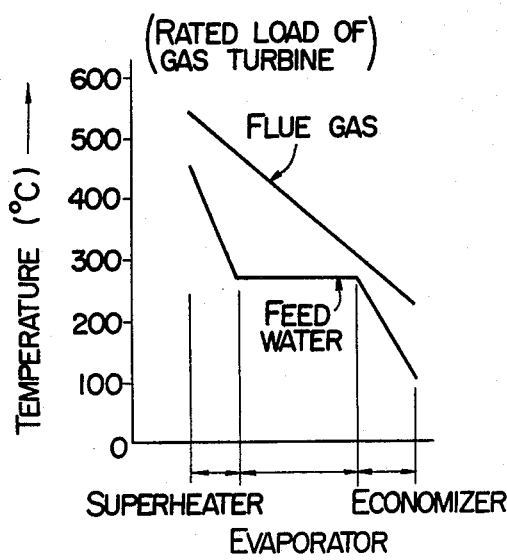
FIG. 2 is a waste heat recovery characteristic diagram showing relations between a combustion gas temperature and a feedwater temperature in a waste heat recovery boiler at 100% load of the gas turbine.
Figure 3:
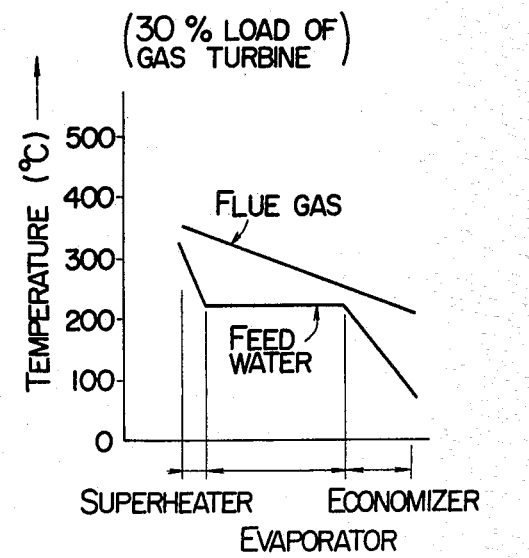
FIG. 3 is a waste heat recovery characteristic diagram of 30% load of the gas turbine.

Temperatures of a flue gas from gas turbine at a rated load operation and 30% load operation of gas turbine in the combined cycle power plant were measured, and the results are shown in FIGS. 2 and 3. Thus, a study of installing location of the apparatus for removing $NO_x$ leads to the results given in the following Table.

Flue gas temperature distribution in the waste heat recovery boiler and $NO_x$ removal efficiency of the apparatus for removing $NO_x$

| Position in waste heat recovery boiler | Rated load operation | | 30% partial load operation | | Overall $NO_x$ removal efficiency of rated load and 30% partial load operations | Remark |
|---|---|---|---|---|---|---|
| | Flue gas temperature (°C.) | $NO_x$ removal efficiency | Flue gas temperature (°C.) | $NO_x$ removal efficiency | | |
| Superheater inlet | 540 | x | 350 | o | x | |
| Superheater outlet to evaporator inlet | 470 | x | 340 | o | x | |
| Evaporator outlet to economizer inlet | 300 | o | 250 | x | x | $SO_x$ in flue gas is converted to ammonium hydrogen sulfate below 280°, which is deposited on the ducts. |
| Economizer outlet | 230 | x | 210 | x | x | |

Note 1: Temperature shows approximate values.
Note 2: The $NO_x$ removal efficiency shows a good performance (o) or bad one (x) when the apparatus for removing $NO_x$ is installed at the respective position in the waste heat recovery boiler.

Thus, it is impossible in the conventional waste heat recovery boiler to obtain good $NO_x$ removal efficiency in a wide range from the rated load operation to 30% partial load operation, even if the apparatus for removing $NO_x$ is installed in any position in the waste heat recovery boiler 20. Thus, in the present invention, the evaporator 22 of the waste heat recovery boiler 20 is divided into two sections 22A, 22B an apparatus 30 for removing $NO_x$ is provided in a space between the two divided sections 22A, 22B. A feedwater forced circulation pump 31 is provided to transfer the feed water between the two divided sections 22A, 22B of evaporator 22.

Figure 5:
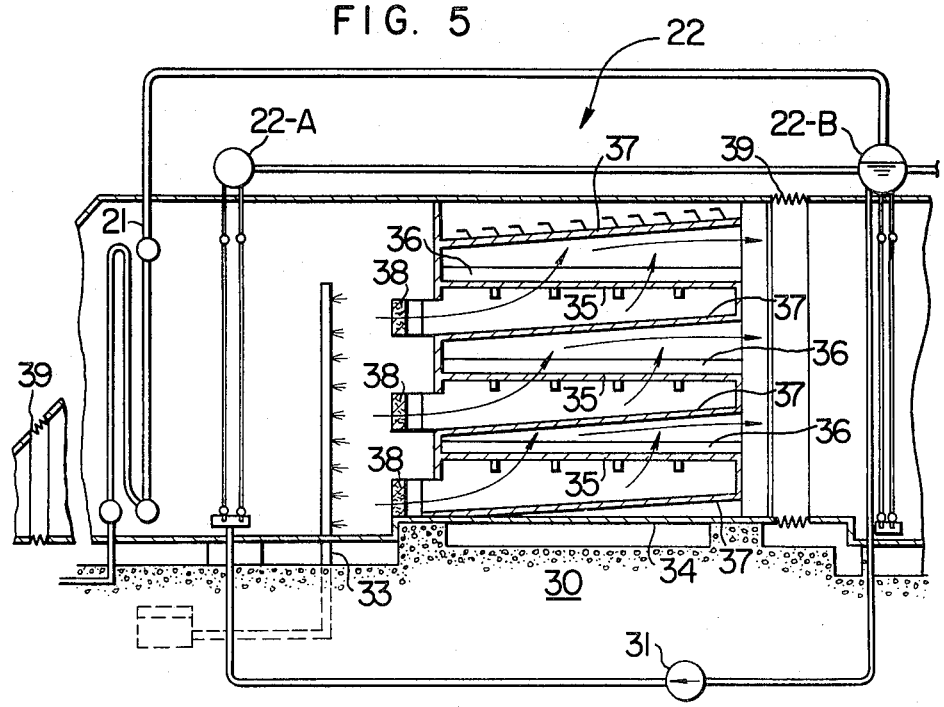

The structure of an evaporator 30 for removing $NO_x$ will be described in detail, referring to FIG. 5. In the apparatus 30 for removing $NO_x$, numeral 35 is a catalyst bed support of a structure which allows the flue gas to pass therethrough. The bed support 35 is horizontally disposed at three stages and a catalyst bed 36 is provided on each of the bed supports 35. Partition plates 37 are provided between the respective bed supports 35 in such an inclined state that the flue gas downstream side of the partition plates 37 can be at a higher level than the flue gas upstream side of the partition plates 37, and dampers 38 are provided for controlling a flow rate of flue gas at the respective flue gas inlets formed between the partition plates 37 and the supports 35. Thus, the flow rate of flue gas containing an appropriate amount of ammonia injected from a reducing agent injection nozzle 33 can be controlled by adjusting the degree of opening of the respective dampers 38, and thus the flue gas can be uniformly passed through the respective catalyst beds 36. Furthermore, the partition plates 37 are provided in the inclined state, and thus pressures of flue gas at the inlet side and the outlet side of the catalyst bed 36 are made uniform in the flue gas flow direction, so that the flue gas can uniformly flow along the entire extent of the catalyst beds.

Furthermore, an expansion joint 39 is provided in the flue gas duct between the flue gas outlet side of the apparatus 30 for removing $NO_x$ and the flue gas inlet side of the half section 22B of the evaporator 22 of the waste heat recovery boiler 20, and thus a relative thermal deformation of the entire flue gas duct can be absorbed.

The combustion flue gas flowing from the half section 22A of the divided evaporator 22 and being admixed with the injected ammonia gas is led to the catalyst beds 36 through dampers 38, and $NO_x$ in the combustion flue gas are decomposed into nitrogen and steam by reduction through the catalyst beds 36. The flue gas freed from $NO_x$ in the reactor 34 then flows to the upstream side of the half section 22B of the divided evaporator 22 through the expansion joint 39.

The function of a waste heat recovery boiler 20 in a combined cycle power plant provided with the apparatus 30 for removing $NO_x$ based on the above noted structure will be described in detail below. In FIGS. 4 and 5, the air 4 introduced in the gas turbine is compressed by the air compressor 11, and used to combust the fuel in the combustor 14 and converted to a high temperature combustion gas, which drives the turbine 12. Then, the combustion flue gas is led to the waste heat recovery boiler 20.

When the gas turbine is operated at a rated load, the flue gas enters into the superheater 21 at about 540° C., as shown by the waste heat recovery characteristic in FIG. 2, and flows into the apparatus 30 for removing $NO_x$ at the combustion flue gas temperature of 450° C. In the apparatus 30 for removing $NO_x$, the combustion flue gas is admixed with an appropriate amount of an ammonia gas from the reducing agent injection nozzle 33 by spray injection, and then is led to the reactor 34. The flow rate of combustion flue gas to the reactor 34 is controlled by the dampers 38, whereby the flue gas can be uniformly passed through a plurality of stages of the catalyst beds 36. In the catalyst beds 36, $NO_x$ in the combustion flue gas are decomposed into harmless nitrogen and steam by reduction through the action of catalyst, and the combustion flue gas substantially freed from $NO_x$ passes through the half section 22B of the evaporator 22 and the economizer 23 at the down stream side, and is vented from a stack 24. The combustion flue gas vaporizes the feedwater in the waste heat recovery boiler 20 as the heat source, so that the generated steam can drive the steam turbine 40.

In the apparatus 30 for removing $NO_x$, the flue gas inlet temperature is as high as about 450° C., and thus a high percent $NO_x$ removal of about 90% can be obtained, as is evident from FIG. 3.

The waste heat recovery characteristic when the gas turbine 10 is operated at 30% partial load is shown in FIG. 3. At the partial load operation of the gas turbine 10, the combustion flue gas temperature is lowered to about 350° C., and thus about 340° C. at the downstream side of the superheater 21 and about 250° C. at the downstream side of a non-divided evaporator. The present apparatus 30 for removing $NO_x$ is provided at the downstream side of the half section 22A of the divided evaporator 22 and at the upstream side of the half section 22B thereof, and thus a higher percent $NO_x$ removal can be obtained even at the 30% partial load operation than when provided at the downstream side of a non-divided evaporator. The present apparatus 30 for removing $NO_x$ can be brought in a higher gas temperature range throughout the entire load range of gas turbine 10, and the percent $NO_x$ removal can be relatively improved.

It is also possible to incorporate an apparatus for removing $NO_x$ based on a recently developed, new process for removing $NO_x$ into the present waste heat recovery boiler. The new process for removing $NO_x$ comprises adding appropriate amounts each of ammonia and hydrogen peroxide into a flue gas, thereby removing $NO_x$ by reduction, and further removing $NO_x$ by reduction and simultaneously removing excess ammonia in a catalyst bed provided at the downstream side. The apparatus based on such process is provided in a flue gas passage at 300° to 450° C., and the catalytic performance can be fully attained.

According to the present invention, a waste heat recovery boiler 20 having an apparatus 30 for removing $NO_x$ with a high percent $NO_x$ removal can be effectively provided for the removal of $NO_x$ from a flue gas, and furthermore a waste heat recovery boiler 20 having an apparatus 30 for removing $NO_x$ with a high efficiency can be provided only by changing a duct arrangement of the boiler 20.

What is claimed is:

1. A waste heat recovery boiler comprising a gas passage for conducting a flue gas discharged from a gas turbine, an economizer for preheating feedwater by the flue gas, an evaporator for evaporating the preheated feedwater, and a superheater for generating steam for driving a steam prime mover by heating the evaporated feedwater, the economizer, the evaporator and the superheater being successively arranged in a direction from a downstream side to upstream side of the gas passage, characterized by dividing the evaporator into two sections in a zone in which a flue gas temperature is 300° to 450° C. in the gas passage, and providing an apparatus for removing $NO_x$ by a chemical reaction from the flue gas in a space in the gas passage between the two divided sections of the evaporator.

2. A waste heat recovery boiler according to claim 1, wherein a device for forcedly circulating feedwater is provided to transfer the feedwater between the two divided sections of the evaporator.

3. A waste heat recovery boiler according to claim 1, wherein the apparatus for removing $NO_x$ by a chemical reaction comprises a reducing agent injection nozzle for supplying an appropriate amount of ammonia into the flue gas, and a catalyst bed provided in the gas passage at a downstream side of the nozzle.

4. A waste heat recovery boiler according to claim 1, wherein the apparatus for removing $NO_x$ by a chemical reaction comprises at least a catalyst bed, and the catalyst bed is divided into a plurality of compartments by a plurality of ducts.

5. A waste heat recovery boiler according to claim 4, wherein the ducts are arranged in the same direction as that of the gas passage, and the catalyst bed is provided on flat levels in the same direction as that of the gas passage.

6. A waste heat recovery boiler according to claim 4, wherein a plurality of the ducts are each provided with devices for controlling flow rates of the flue gas to the respective ducts.

7. A waste heat recovery boiler comprising a gas passage means for conducting a flue gas discharged from a gas turbine to a venting stack, and evarporator means for evaporating preheated feedwater of the boiler, characterized in that the evaporator means is disposed in a zone of the gas passage means in which a temperature of the flue gas is between 300° to 450°, the evaporator means includes a first evaporator section and a second evaporator section, said second evaporator section being disposed at a position spaced from and downstream of the first evaporator section, as viewed in a flow direction of the flue gas through the gas passage means, and in that means are disposed in the gas passage means in a space between the first and second evaporator sections for removing $NO_x$ by a chemical reaction from the flue gas flowing through the gas passage means.

8. A waste heat recovery boiler according to claim 7, characterized in that said means for removing $NO_x$ by a chemical reaction from the flue gas includes a catalyst means disposed between the first and second evaporator sections for removing the $NO_x$ from the flue gas passed through the gas passage means.

9. A waste heat recovery boiler according to claim 7 or 8, characterized in that the means for removing the $NO_x$ by a chemical reaction from the flue gas includes an injection nozzle means for injecting a reducing agent into the flue gas.

10. A waste heat recovery boiler according to claim 8, characterized in that means are provided for controlling a flow of the flue gas through the catalyst means.

11. A waste heat recovery boiler according to claim 9, characterized in that means are provided for transferring feedwater between the first and second evaporator sections.

* * * * *

REEXAMINATION CERTIFICATE (1374th)
United States Patent [19]
Inui et al.

[11] B1 4,466,241
[45] Certificate Issued  Oct. 23, 1990

[54] WASTE HEAT RECOVERY BOILER

[75] Inventors: Taiji Inui, Hitachi; Makoto Sasaki, Morioka, both of Japan

[73] Assignee: Hitachi Ltd., Tokyo, Japan

Reexamination Request:
No. 90/001,545, Jun. 30, 1988

Reexamination Certificate for:
Patent No.: 4,466,241
Issued: Aug. 21, 1984
Appl. No.: 4,266
Filed: Jan. 17, 1979

[30] Foreign Application Priority Data

Jan. 18, 1978 [JP] Japan .................... 53-3381

[51] Int. Cl.$^5$ .............................. F02C 6/18
[52] U.S. Cl. ...................... 60/39.182; 60/39.5; 122/7 R
[58] Field of Search .............. 60/39.182, 39.5; 122/4 D, 7 R; 423/239

[56] References Cited
U.S. PATENT DOCUMENTS 1,255,164  2/1918  Heaton .
1,289,182  12/1918  Jacobus .
1,883,705  10/1932  Gordon .
4,106,286  8/1978  Sakai et al. .

OTHER PUBLICATIONS

Marine Engineering, vol. 1, Chapter IV, Section 2, entitled "Natural-Circulation Boilers, Furnaces, Superheaters, Economizers and Air Heaters" (pp. 81-101).

Primary Examiner—Louis J. Casareyola
Attorney, Agent, or Firm—Antonelli, Terry, Stout & Kraus

[57] ABSTRACT

A waste heat recovery boiler for generating steam by utilizing a flue gas discharged from a gas turbine as a heat source comprises an economizer for preheating feedwater by the flue gas, an evaporator for evaporating the preheated feedwater, and a superheater for generating a steam for driving a steam prime mover by heating the evaporated feedwater. The economizer, the evaporator and the superheater are successively arranged in the direction from a downstream side to an upstream side of flue gas passage. The evaporator itself is divided into two sections and an apparatus for removing $NO_x$ is provided in a space between the divided two sections of the evaporator in the flue gas passage to remove $NO_x$ from the flue gas. An $NO_x$ concentration of a flue gas discharged from a combined cycle power plant including the gas turbine can be stably abated at any of full and partial loads.

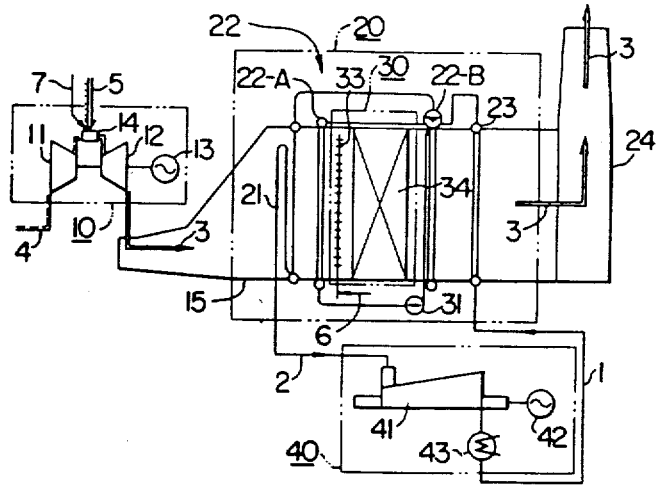

REEXAMINATION CERTIFICATE
ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

* * * * *